United States Patent [19]

Tsuchiya et al.

[11] 4,348,699
[45] Sep. 7, 1982

[54] APPARATUS FOR RECORDING AND/OR REPRODUCING DIGITAL SIGNAL

[75] Inventors: Yoshikazu Tsuchiya; Masato Tanaka; Takenori Sonoda; Tetsu Watanabe, all of Tokyo; Chiaki Kanai, Kanagawa-ken; Nobuhiko Watanabe, Tokyo, all of Japan

[73] Assignee: Sony Corporation, Tokyo, Japan

[21] Appl. No.: 149,299

[22] Filed: May 13, 1980

[30] Foreign Application Priority Data

May 15, 1979 [JP] Japan .................................. 54-59254

[51] Int. Cl.$^3$ ........................... G11B 5/00; G11B 5/09
[52] U.S. Cl. ....................................... 360/32; 360/51; 360/73
[58] Field of Search .................. 360/27, 28, 32, 51, 360/73

[56] References Cited

U.S. PATENT DOCUMENTS 3,982,277  9/1976  Waylor .................................. 360/51
4,222,079  9/1980  Onishi et al. .......................... 360/51
4,224,642  9/1980  Mawatari et al. ..................... 360/32

Primary Examiner—Vincent P. Canney
Attorney, Agent, or Firm—Lewis H. Eslinger; Alvin Sinderbrand

[57] ABSTRACT

An apparatus for recording and/or reproducing a serial digitized analog signal controls the transport speed of a recording medium according to the sampling rate employed in digitizing the analog signal to produce a constant data density on the recording medium regardless of the sampling rate selected. The frequency of a fundamental clock signal establishes the sampling frequency during recording. A coded timing signal also recorded on the recording medium includes both a sync signal and a coded identity of the sampling frequency in use. During reproduction, the coded identity of the sampling frequency is used to select the same fundamental clock signal as was used during recording and the reproduced sync signal is phase compared with a reference signal derived from the fundamental clock signal to correspondingly control the speed and phase of transport of the recording medium. The fundamental clock signal may be manually varied during reproduction for pitch control of the reproduced analog signal.

11 Claims, 5 Drawing Figures

APPARATUS FOR RECORDING AND/OR REPRODUCING DIGITAL SIGNAL

BACKGROUND OF THE INVENTION

The present invention relates to an apparatus for recording and/or reproducing a serial digital signal, and is directed more particularly to an apparatus for recording and/or reproducing a pulse-code-modulated audio signal on a moving recording medium.

An analog signal, such as an audio signal, may be repetitively digitized at a sampling frequency. Each time the analog signal is sampled, a multi-bit digital representation of the amplitude thereof is produced. For example, a digital number of 8 bits may be produced for each sample of the audio signal. The 8 bits may be serially recorded on a recording medium, for example, in a track extending longitudinally on a tape, in parallel oblique tracks on a video tape, or on a video disc, for later reproduction.

When a signal is recorded by a magnetic head on a moving magnetic medium, a given frequency can be considered to produce a wavelength on the magnetic recording medium which depends on the transport speed of the magnetic medium.

Magnetic recording and reproducing heads depend upon a recording gap therein for producing or detecting a magnetic field in the tape or other recording medium. When the wavelength of the highest frequency signal is large compared to the gap width, the reproduced output is degraded. Alternatively, when the wavelength of the maximum frequency is reduced to less than twice the gap width, a rapid loss in reproduced signal is obtained. It is, therefore, desirable to maintain a transport speed for the record medium which is high enough to give good output but not so high as to produce too short a wavelength.

In addition to the above factors, it is desirable to produce as short a wavelength as possible on the recording medium in order to have a maximum recording density. This permits the use of a minimum amount of recording medium for a given amount of recorded information. That is, if a low sampling frequency is employed, a correspondingly low transport speed may be used in order to produce an optimum data density on the recording medium. Conversely, when a high sampling frequency is used, a high transport speed may be used to produce the same data density.

The above-mentioned change in the transport speed of the recording medium becomes important when a number of different sampling frequencies and/or data sources must be accommodated. For example, pulse code modulation signal recording and/or reproducing may be effected with apparatus of the rotary head type using a video tape recorder and with apparatus of the stationary head type using a linear tape drive.

In the rotary head video tape recorded system, a pulse code modulated signal is time-base-compressed to provide data-missing periods into which horizontal and vertical synchronizing signals of a standard television signal may be inserted for controlling the video tape recorder on playback. In order to provide a sampling frequency high enough to record and reproduce an audio signal having a bandwidth of 20 KHz, and to provide an integral number of samples during each horizontal period, a sampling frequency of at least 40 KHz is required. A sampling frequency of 44.056 HKz has been employed for recording on a rotary head video tape recorder which is normally employed to process signals of the NTSC color system. This sampling frequency permits recording of three samples per horizontal interval and accommodates 35 non-recordable lines in each NTSC frame for receiving the equivalent of the synchronizing signals.

In a stationary head system, a sampling frequency is selected to again permit recording and reproduction of an audio signal having a bandwidth of 20 KHz and desirably which has an integral relationship with the above sampling frequency for a rotary head system. For this reason, a sampling frequency for a fixed head system may be 50.35 KHz for compatibility with the above-described NTSC rotary head system. Such sampling frequencies for the rotary head and fixed head systems are related by a factor of 8/7.

Other sampling frequencies have been proposed such as 32 KHz, which is compatible with the data rate in the microwave links of the British Broadcasting Corporation, and 48 KHz in other recording devices. A sampling frequency of 32 KHz is not, of course, capable of providing a bandwidth of 20 KHz.

Additional problems occur in a fixed head system having separate record and playback heads when editing is attempted by cut-in of new recorded material on a track previously recorded using a different sampling frequency. Such apparatus normally employs a playback head spaced a significant distance forward of the record head. The playback head reproduces the previously recorded information which then is processed to reconstruct the original signal. Similarly, new information to be recorded must be prepared by sampling, converting and formatting before being applied to the recording medium. Both reconstruction of previously recorded information and preparation of new information take a relatively long time. A relatively large spacing is, therefore, needed between the playback and record heads to accommodate this delay for a particular recorded data density. If the new material to be recorded has a sampling rate which is different from the originally recorded material, then an attempt to joint edit new and old material for cross-fading or the like with a constant transport speed of the tape interrupts the continuity of the original signal and a sound skip may result at the cut-in point.

OBJECTS AND SUMMARY OF THE INVENTION

Accordingly, it is an object of the present invention to provide an apparatus for recording and/or reproducing digital signals having different sampling frequencies.

It is a further object of the invention to provide an apparatus for recording and reproducing digital signals at a constant recording density by varying the transport speed of a recording medium in accordance with changes in the sampling frequency.

It is a further object of the invention to provide an apparatus for recording a serial digital data signal produced by sampling an analog signal at a selected sampling frequency and for recording a coded signal on the recording medium identifying the selected sampling frequency that was used.

It is a further object of the invention to provide an apparatus for reproducing a recorded digital signal in which a coded signal identifying the sampling frequency used during recording is employed to establish a master clock frequency to be used during reproduction for controlling the transport speed of the recording medium.

It is a further object of the invention to provide variation of the master clock frequency for pitch control during playback or reproduction.

It is a further object of the invention to control the speed and phase of the transport of the recording medium during reproduction in accordance with a phase comparison between a synchronizing signal reproduced from the recording medium and a signal related to the master clock frequency.

According to an aspect of the invention, there is provided an apparatus for digitally recording an analog signal comprising means for generating fundamental clock pulses having a selected clock frequency, means for sampling the analog signal at a sampling frequency which is related to the selected clock frequency, means for digitizing the samples from the means for sampling, a recording medium, means for recording the digitized samples on the recording medium, and means for moving the recording medium at a speed which is related to the selected clock frequency.

According to another aspect of the invention, there is provided an apparatus for reproducing a recorded signal from a moving recording medium, the signal including at least digital data, and a control signal including a synchronizing signal and a frequency code signal related to a sampling frequency which was used during a recording operation, comprising means for generating fundamental clock pulses, means for reproducing the control signal, means responsive at least to the frequency code in the reproduced control signal for selecting the frequency of the fundamental clock pulses, means for reproducing the digital data, means for converting the digital data to an analog signal at a sampling frequency which is related to the selected frequency, and means for moving the recording medium at a speed which is related to the selected frequency.

According to another aspect of the invention, there is provided an apparatus for digitally recording an analog signal and for reproducing the analog signal comprising means for generating fundamental clock pulses having a selected clock frequency, means for sampling the analog signal at a first sampling frequency which is related to the selected clock frequency, means for digitizing the samples from the means for sampling, a recording medium, means for recording the digitized samples on the recording medium, means operative during recording for moving the recording medium at a speed which is related to the selected clock frequency, means for recording a control signal on the recording medium, the control signal including at least a synchronizing signal related to the selected clock frequency and a coded frequency identity signal identifying the selected clock frequency, means for reproducing the digitized samples from the recording medium, means for reproducing said control signal from the recording medium, means for converting the digitized samples to an analog signal at a second sampling frequency which is related to the predetermined frequency, means operative during reproducing and being responsive to the synchronizing signal from the reproduced control signal and to a reference signal related to the selected clock frequency for moving the recording medium at a speed which is related both to the selected clock frequency and to the synchronizing signal, and means operative during reproducing and being responsive at least to the frequency identity signal in the reproduced control signal for establishing the selected clock frequency of the fundamental clock pulses.

The above, and other objects, features and advantages of the present invention, will become apparent from the following description of an illustrative embodiment to be read in conjunction with the accompanying drawings in which like reference numerals designate the same elements.

DETAILED DESCRIPTION OF THE PREFERRED EMBODIMENT

Figure 1:
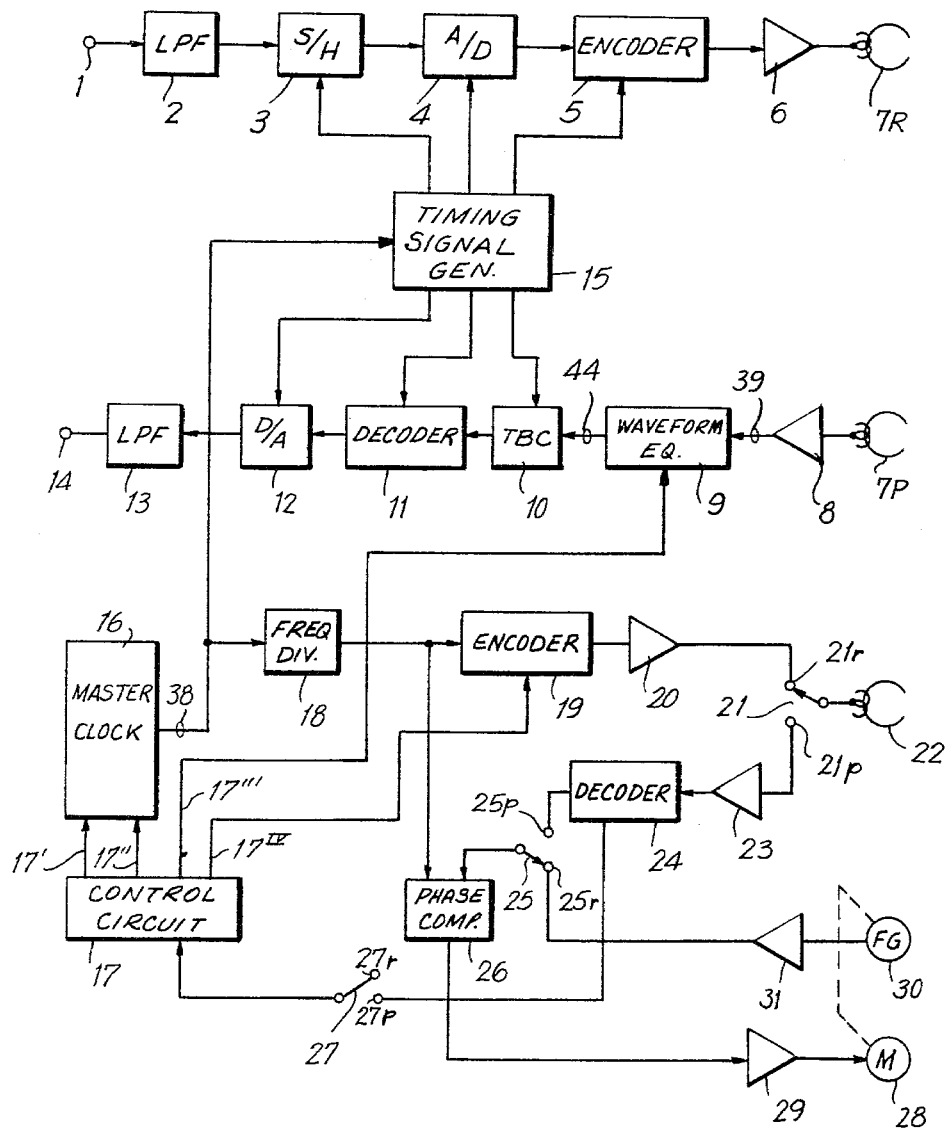
FIG. 1 is a block diagram of a digital signal recording and/or reproducing apparatus according to an embodiment of the present invention.

Referring now to FIG. 1, it will be seen that, in an apparatus according to this invention, as there illustrated, an analog signal such as, for example, an audio signal, is applied through an input terminal 1 to a low pass filter 2. Low pass filter 2 removes high frequency components of the analog signal and applies the result to a sample-and-hold 3. Sample-and-hold 3 samples the output of low pass filter 2 at a selected sampling frequency and provides output samples to an A/D converter 4 each of which samples is equal to the amplitude of the input signal at the instant of sampling. A/D converter 4 produces a multibit digital signal of each sample which it applies to an encoder 5.

Although it does not form a part of the present invention, encoder 5 may include one or more memories for storing one or more of the multi-bit digital words from A/D converter 4. In the preferred embodiment, encoder 5 stores a plurality of digital words from A/D converter 4, time base compresses the digital words to create data-lacking intervals, inserts one or more error correcting and/or error detecting words and a synchronizing signal in the data-lacking intervals and feeds the resulting signal serially one bit at a time through a recording amplifier 6 to a recording head 7R. The serial digital data is recorded by recording head 7R on a magnetic tape (not shown) moving therepast at a selected transport speed.

The operations of sample-and-hold 3, A/D converter 4 and encoder 5 are synchronized by clock signals from a timing signal generator 15.

As previously discussed, the wavelength of data recorded on the magnetic tape depends both on the sampling frequency and on the tape transport speed. The timing signals from timing signal generator 15 are produced in response to fundamental clock pulses applied from a master clock 16 to timing signal generator 15. Master clock 16 is operative to produce any one of a plurality of fundamental clock pulse frequencies in response to a frequency control signal on a control line 17' from a control circuit 17. The fundamental clock pulses are also applied to a frequency divider 18 which divides the frequency thereof by a fixed integral value greater than 1. The output of frequency divider 18 is employed, during both recording and reproducing, for controlling the speed of a capstan drive motor 28 and is also employed during recording to produce a synchronizing and a coded frequency identifying signal for recording on the recording medium by a separate magnetic head 22. During reproduction or playback, the signal reproduced by magnetic head 22 is employed both for capstan speed control and for establishing the fundamental clock frequency of master clock 16.

More particularly, the output of frequency divider 18 is shown on FIG. 1 to be encoded in an encoder 19 to produce a synchronizing signal. A control signal corresponding to the frequency in use is applied to encoder 19 on control line IV from control circuit 17, and encoder 19 produces a respective coded frequency identifying signal. Although other coding schemes are within the scope of the present invention, frequency shift keying employing three frequencies is employed in the preferred embodiment. The coding frequencies are identified as "0", "1" and "2". Frequencies "0" and "1" are used as mark and space frequencies for producing the coded frequency identity signal. The third frequency, "2", is reserved for producing a synchronizing signal.

Figure 2A:
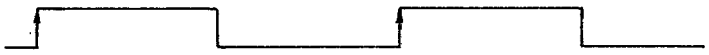
FIGS. 2A and 2B are waveforms to which reference will be made in explaining the operation of the apparatus of FIG. 1.
Figure 2B:

Referring to FIGS. 2A and 2B, the positive-going leading edges of the output of frequency divider 18, indicated by upward-pointing arrows (FIG. 2A), produce pulses of frequency "2" which are followed by a period in which selected combinations of "0" and "1" frequencies are produced by encoder 19 to identify the master clock frequency. The coded output of encoder 19 is applied through a recording amplifier 20 and a recording contact 21r of a record/playback switch 21 to magnetic head 22. Thus, during recording, the synchronizing and coded frequency identifying signals of FIG. 2B are recorded on a control track on the moving recoding medium (not shown) which is separate from the portion receiving the recorded information signals.

The output of frequency divider 18 is also applied to an input of a phase comparator 26. A frequency generator 30 is mechanically coupled to rotate with a capstan drive motor 28 and produces output pulses related to the rotational phase and/or speed of drive motor 28. The pulses from frequency generator 30 are applied through an amplifier 31 and a recording contact 25r of a record/playback switch 25 to a second input of phase comparator 26. The output of phase comparator 26 is applied through a drive amplifier 29 to drive motor 28. As is well known, phase comparator 26 produces an output signal whose amplitude is related to the difference in phase between its two inputs. Thus, the output of phase comparator 26 tends to speed up or slow down drive motor 28 to maintain a predetermined phase relationship between the pulses from frequency generator 30 and the reference pulses from frequency divider 18. In this way, drive motor 28 adjusts and controls the transport speed of the recording medium in relation to the output frequency of master clock 16.

In the manner just described, the sampling frequency of the signal recorded by recording head 7R and the transport speed of the recording medium are both controlled by the frequency of the fundamental clock pulses from master clock 16. In this way, the wavelengths of recorded data are maintained at the optimum value.

During playback or reproduction, playback head 7P reproduces the digitized data or information signal while magnetic head 22 reproduces the synchronizing and coded frequency identifying signals. The digital data signal from playback head 7P is employed to reconstruct the analog input signal. The synchronizing signal and the coded frequency identifying signal from head 22 are employed to select the frequency of the fundamental clock pulses from master clock 16 as well as to control the rotation of drive motor 28.

The reproduced data signal from playback head 7P is applied through a playback amplifier 8 to one input of a waveform equalizer 9. As the speed of the recording medium is changed, the sharpness of the positive-going leading edges of the signal reproduced by playback head 17P is also changed. Waveform equalizer 9, under control of a control signal on a line 17''' from control circuit 17 compensates, or sharpens, the positive-going leading edges of the reproduced digital data or information signal from playback amplifier 8 according to the frequency of the fundamental clock pulses before feeding the digital signal to time base corrector 10. Thus, optimum compensation of the reproduced signal is effected by waveform equalizer 9 according to the transport speed selected by control circuit 17, for example, in response to a suitable manual actuation of the latter.

Time-base corrector 10, of a type well known in the art, stores the digital data and then clocks it out at a selected frequency controlled by clock signals from timing signal generator 15. Time-base corrector 10 thereby removes from the signal received from waveform equalizer 9 any time base errors which may have occurred due to variations in speed of the recording medium during recording and/or reproducing or other factors, such as, temperature, humidity or stretch of the recording medium. The output of time-base corrector 10, which preferably does not contain synchronizing signals but may still be accompanied by error correcting and/or error detecting words inserted therein during the recording process, is applied to an input of a decoder 11. Decoder 11 detects and corrects errors in the digital signal under control of clock signals from timing signal generator 15 and applies the resulting corrected digital signal to D/A converter 12. D/A converter 12, under control of clock signals from timing signal generator 15, reconstructs analog signal values responsive to the digital values of the output of decoder 11. The output of D/A converter 12, after passing through a low pass filter 13, is applied to an output terminal 14. The analog signal at output terminal 14 is a reproduced version of the analog signal previously applied to input terminal 1 and recorded on the recording medium.

During reproduction, the composite control signal made up of the synchronizing and coded frequency identifying signals reproduced by magnetic head 22 are applied through playback terminal 21p of record/playback switch 21 and a playback amplifier 23 to an input of a decoder 24. Decoder 24 provides from the composite control signal a synchronizing signal which is applied to a playback terminal 25p of a record/playback switch 25 and a coded frequency identifying signal applied to a playback terminal 27p of a switch 27 which is closed only during playback.

The synchronizing signal from decoder 24 occurs solely in response to frequency "2" (FIG. 2B) in the output of playback amplifier 23 and thus is a pulse signal corresponding to that shown in FIG. 2A. Such synchronizing signal from decoder 24 is applied through record/playback switch 25 to the second input of phase comparator 26. Thus, in the reproducing operation, phase comparator 26 compares the synchronizing signal from decoder 24 with the output of frequency divider 18 and provides a resulting output signal which is applied through drive amplifier 29 to drive motor 28 to drive the recording medium at a speed which will maintain the synchronizing signal from decoder 24 in a predetermined phase relationship with the output of frequency divider 18.

The decoded frequency identifying signal from switchh 27 is applied to an input of control circuit 17 during playback, and control circuit 17 responds thereto to produce a respective frequency select signal on control line 17'. The frequency select signal on line 17' is applied to master clock 16 for selection of a basic fundamental clock pulse frequency. In addition, a manually controlled pitch control signal may be applied from control circuit 17 by way of control line 17" to master clock 16 for slightly increasing or decreasing the frequency of the fundamental clock pulses from master clock 16 so as to accomplish pitch control. Further, as previously described, during reproduction, control circuit 17 applies a control signal on control line 17''' to waveform equalizer 9 which varies the transfer function of waveform equalizer 9 according to the fundamental clock pulse frequency that is selected.

Figure 3:
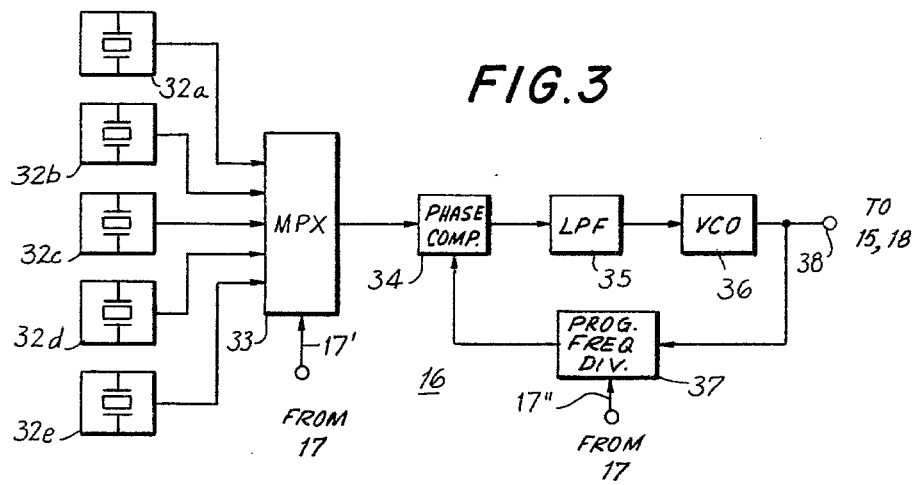
FIG. 3 is a block diagram of a master clock suitable for use in the apparatus of FIG. 1.

Referring now to FIG. 3, it will be there seen that master clock 16 may include a plurality, suitably five, of stable clock oscillators 32a, 32b, 32c, 32d, and 32e which are preferably crystal controlled to produce predetermined different frequencies. The outputs of clock oscillators 32a–32e are applied to inputs of a multiplexer 33. The control signal on control line 17' from control circuit 17 is applied to multiplexer 33 for selecting the output of an appropriate one of clock oscillators 32a–32e for application to an input of a phase comparator 34.

A voltage controlled oscillator 36 produces an output frequency which is applied through output terminal 38 to inputs of frequency divider 18 and timing signal generator 15 (FIG. 1) and to an input of a programmable frequency divider 37. The output of programmable frequency divider 37 is applied to a second input of phase comparator 34. The dividing ratio of programmable frequency divider 37 is controlled by a pitch control signal on control line 17" from control circuit 17. The output of phase comparator 34 is an analog control signal whose amplitude is dependent on the relationship between the phases of its two inputs. The output of phase comparator 34 is applied through a low pass filter 35 to the input of voltage controlled oscillator 36 to complete a phase-locked loop. Thus, the output of voltage controlled oscillator 36 is controlled to a frequency equal to n times the output frequency of multiplexer 33, where n is the frequency dividing ratio of programmable frequency divider 37. Accordingly, the output frequency applied to output terminal 38 is generally determined by a selected one of clock oscillators 32a–32e, and is modified by the dividing ratio n of programmable frequency divider 37 which is variable for the pitch control.

Alternatively, master clock 16 may use a single clock oscillator (not shown) wherein the output frequency at output terminal 38 is varied under control of programmable frequency divider 37. The output of a selected one of clock oscillators 32a–32e may alternatively be used directly without employing the phase-locked loop, but, in that case, pitch control by programmable frequency divider 37 is not available.

Figure 4:
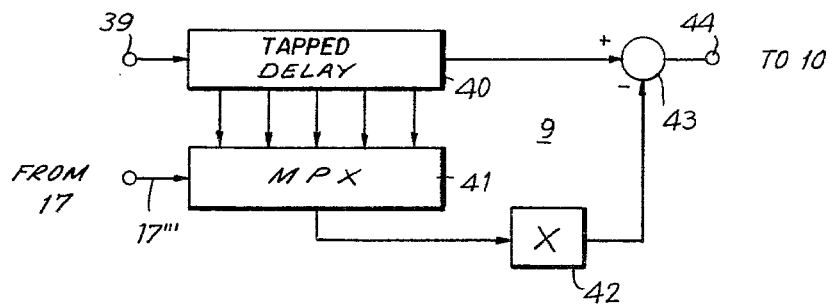
FIG. 4 is a block diagram of a waveform equalizer suitable for use in the apparatus of FIG. 1.

Referring now to FIG. 4, it will be seen that waveform equalizer 9 may be a transversal filter having a tapped delay 40, a multiplier 41, a multiplexer 42 and a subtractor 43. Tapped delay 40 receives the reproduced digital data or information signals at an input terminal 39 and has a number of taps at which respective output signals are provided with successive different delays for application to respective inputs of multiplexer 42. A further output at the end of tapped delay 40 is applied to a plus input of subtractor 43. The output of each tap of tapped delay 40 includes a delay component and a reflected component which has a total delay exceeding the full delay of tapped delay 40.

The control signal on line 17''' applied to multiplexer 41 selects the signal from the appropriate tap according to the fundamental clock pulse frequency chosen by control circuit 17. The delayed and reflected signals from the selected tap are multiplied by a factor less than one by multiplier 42 and applied to a minus input of subtractor 43. The output of subtractor 43 is applied through output terminal 44 to time base corrector 10 (FIG. 1).

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An apparatus for digitally recording an analog signal on a movable recording medium, with a predetermined data density, comprising:
  means for generating fundamental clock pulses having a selected clock frequency;
  means for sampling said analog signal at a sampling frequency which is related to said selected clock frequency;
  means for digitizing the samples from said means for sampling;
  means including a transducer for recording the digitized samples on said recording medium; and
  means for moving said recording medium at a speed which is varied in response to changes in said selected clock frequency such that said samples are recorded on said medium with said predetermined data density independently of said sampling frequency.

2. An apparatus according to claim 1; further comprising means for recording on said recording medium a signal identifying said selected clock frequency.

3. An apparatus according to claim 1; further comprising means including an additional transducer for recording on said recording medium a synchronizing signal related to said selected clock frequency.

4. An apparatus according to claim 3; wherein said additional transducer further receives a signal identifying said selected clock frequency for recording said identifying signal on said recording medium.

5. An apparatus according to claim 1; wherein said means for moving includes:
  drive means for driving the recording medium;
  a frequency generator coupled to said drive means and operative to produce a phase signal related to at least a phase of said drive means;
  means for comparing a phase of said phase signal with a phase of a reference signal related to said selected clock frequency and for producing a phase error signal in response to the comparison; and
  means responsive to said phase error signal to cause said drive means to drive said recording medium at a speed effective to maintain the phases of said phase signal and said reference signal in a substantially predetermined relationship.

6. An apparatus according to claim 1; further comprising means for producing a control signal related to said sampling frequency and means for recording said control signal on said recording medium.

7. An apparatus for reproducing a recorded signal from a moving recording medium, said signal including at least digital data, and also reproducing a control signal, said control signal including a synchronizing signal and a frequency code signal related to a sampling frequency which was used during a recording operation in which said recorded signal was recorded on said medium with a predetermined data density independent of said sampling frequency, said apparatus comprising:

means for generating fundamental clock pulses having a selected clock frequency;

means for reproducing said digital data from said medium;

means for converting said digital data to an analog signal at a sampling frequency which is related to said selected clock frequency;

means for reproducing said control signal from said medium;

means responsive at least to said frequency code signal in the reproduced control signal for establishing said selected clock frequency of said fundamental clock pulses; and means for moving said recording medium at a speed which is varied in response to changes in said selected clock frequency, said speed being the speed at which said recorded signal was recorded on said medium with said predetermined data density independent of said sampling frequency.

8. An apparatus according to claim 7; wherein said means for moving includes:

a phase comparator;

means for decoding said synchronizing signal reproduced from said recording medium;

means for comparing a phase of said synchronizing signal with a phase of a reference signal related to said selected clock frequency and for producing a phase error signal in response to the comparison; and drive means responsive to said phase error signal operative to drive said recording medium at a speed effective to maintain the phases of said reference signal and said synchronizing signal in a substantially predetermined relationship.

9. An apparatus according to claim 7; wherein said means for establishing the selected clock frequency includes at least first and second oscillators having first and second different substantially constant frequencies, respectively, means for selecting one of said first and second frequencies, means for generating a pitch control signal, and means responsive to said pitch control signal for varying the selected one of said first and second frequencies so as to correspondingly vary said sampling frequency and said speed.

10. An apparatus according to claim 7; wherein said means for reproducing said digital data includes a waveform equalizer effective to compensate the waveform of said digital data in accordance with said selected clock frequency.

11. An apparatus for digitally recording an analog signal and for reproducing said analog signal comprising:

means for generating fundamental clock pulses having a selected clock frequency;

means for sampling said analog signal at a first sampling frequency which is related to said selected clock frequency;

means for digitizing the samples from said means for sampling;

a recording medium;

means for recording the digitized samples on said recording medium;

means operative during recording for moving said recording medium at a speed which is related to said selected clock frequency;

means for recording a control signal on said recording medium, said control signal including at least a synchronizing signal related to said selected clock frequency and a coded frequency identifying signal identifying said selected clock frequency;

means for reproducing said digitized samples from said recording medium;

means for converting said digitized samples to an analog signal at a second sampling frequency which is related to said selected clock frequency;

means for reproducing said control signal;

means operative during reproducing and being responsive to said synchronizing signal of the reproduced control signal and to a reference signal related to said selected clock frequency for moving said recording medium at a speed which is related both to said selected clock frequency and to said synchronizing signal; and means operative during reproducing and being responsive at least to said frequency identifying signal in said reproduced control signal for establishing said selected clock frequency of said fundamental clock pulses.

* * * * *